United States Patent
Partridge et al.

(10) Patent No.: US 12,360,883 B2
(45) Date of Patent: Jul. 15, 2025

(54) TEST GENERATION FOR ROBOTIC PROCESS AUTOMATION ROBOTS THAT INTERACT WITH USER INTERFACES

(71) Applicant: INTERNATIONAL BUSINESS MACHINES CORPORATION, Armonk, NY (US)

(72) Inventors: Ian Partridge, Eastleigh (GB); Christopher Neil Bailey, Romsey (GB); Sandra Hayward, Eastleigh (GB); Matthew Paul Wilson, Eastleigh (GB); David Richard Jones, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 60 days.

(21) Appl. No.: 18/506,232

(22) Filed: Nov. 10, 2023

(65) Prior Publication Data
US 2025/0094320 A1  Mar. 20, 2025

(30) Foreign Application Priority Data
Sep. 20, 2023 (GB) .................................... 2314427

(51) Int. Cl.
*G06F 11/3668* (2025.01)
*G06F 9/451* (2018.01)

(52) U.S. Cl.
CPC .......... *G06F 11/3676* (2013.01); *G06F 9/451* (2018.02)

(58) Field of Classification Search
CPC ............................ G06F 11/3676; G06F 9/451
See application file for complete search history.

(56) References Cited

U.S. PATENT DOCUMENTS 9,348,738 B2 * 5/2016 Eilam ................. G06F 11/3672
2018/0173614 A1 * 6/2018 Gong .................... G06F 3/0304
(Continued)

FOREIGN PATENT DOCUMENTS

| CN | 112131129 A | 12/2020 |
| CN | 114817078 A | 7/2022 |

OTHER PUBLICATIONS

Pact, "Introduction", Pact, [Accessed Sep. 29, 2023], 8 pgs., Retrieved from the Internet: <https://docs.pact.io/>.
(Continued)

*Primary Examiner* — Bryce P Bonzo
*Assistant Examiner* — Audrey Emma Whitesell
(74) *Attorney, Agent, or Firm* — Elliot J. Shine (57) ABSTRACT

A method, computer program product, and computer system for testing of robotic process automation robots that interact with user interfaces. The method includes obtaining analysis of commands in a robotic process automation script to determine interaction of the commands with one or more user interface applications. The method includes extracting a list of commands that interact with user interface controls and grouping the commands by user interface application. The method then generates a set of tests for each user interface application, with the set of tests including the commands for user interface control interactions and assertions of a state of each user interface control interacted with. The method provides a set of tests for a robot for each user interface application.

18 Claims, 4 Drawing Sheets

(56) References Cited

U.S. PATENT DOCUMENTS

2021/0109847 A1    4/2021  Karthik
2022/0100639 A1    3/2022  Weishaar

OTHER PUBLICATIONS

Parasoft, "Optimize Selenium Testing With Artificial Intelligence", Parasoft.com, [Accessed Sep. 27, 2023], 8 pgs., Retrieved from the Internet: <https://www.parasoft.com/products/parasoft-selenic/>.
Selenium, "Getting Started", Selenium.dev, [Accessed Sep. 29, 2023], 5 pgs., Retrieved from the Internet: <https://www.selenium.dev/selenium-ide/docs/en/introduction/getting-started#recording-your-first-test>.
Selenium, "Selenium IDS, Open Source Record and Playback Test Automation for the Web", Selenium.com, [Accessed Sep. 29, 2023], 8 pgs., Retrieved from the Internet: <https://www.selenium.dev/selenium-ide/>.
Partridge et al., "Test Generation for Robotic Process Automation Robots That Interact With User Interfaces", Application No. 2314427.2, Filed Sep. 20, 2023, 21 pages.

* cited by examiner

TEST GENERATION FOR ROBOTIC PROCESS AUTOMATION ROBOTS THAT INTERACT WITH USER INTERFACES

BACKGROUND

The present invention relates to robotic process automation testing, and more specifically, to test generation for robotic process automation robots that interact with user interfaces.

Robotic process automation (RPA), also known as software robotics, uses automation technologies to mimic back-office tasks of human workers, such as extracting data, filling in forms, moving files, etc. RPA combines application programming interfaces (APIs) and user interface (UI) interactions to integrate and perform repetitive tasks between applications. By deploying scripts which emulate human processes, RPA tools may complete autonomous execution of various activities and transactions across unrelated software systems.

RPA tools are commonly used to automate interactions with user interfaces (UIs). The RPA tools can be used to provide an integration point for other software where an application programming interface (API) is not available. RPA tools work by scripting interactions with UI controls that simulate the actions of a human user. However, these scripts are fragile because they depend on the layout and construction of the UI. If a user interface control that an RPA script uses is renamed, moved or changed, the script will break and require manual modification.

Also, the RPA script and the UI are likely to be developed by different teams, who may not be aware of the impact of changes. Testing RPA bots requires executing them in real time, and therefore is slow to give feedback. An RPA script might interact with other systems such as a database or e-mail server, and therefore setting up and maintaining a suitable test environment is challenging.

SUMMARY

According to an aspect of the present invention there is provided a computer-implemented method for test generation for robotic process automation robots that interact with user interfaces, said method comprising: obtaining analysis of commands in a robotic process automation script to determine interaction of the commands with one or more user interface applications; extracting a list of commands that interact with user interface controls and grouping the commands by user interface application; generating a set of tests for each user interface application, with the set of tests including the commands for user interface control interactions and assertions of a state of each user interface control interacted with; and providing a set of tests for a user interface application.

The method provides the advantage that it generates sets of tests that encapsulate only the UI interactions for a UI application, and not interactions with other parts of the system. Therefore, failures identified by the tests are limited to UI issues.

According to an aspect of the present invention there is provided a system for test generation for robotic process automation robots that interact with user interfaces, comprising: a processor and a memory configured to provide computer program instructions to the processor to execute the function of the components: a command analysis component for obtaining analysis of commands in a robotic process automation script to determine interaction of the commands with one or more user interface applications; a command extraction component for extracting a list of commands that interact with user interface controls and a command grouping component for grouping the commands by user interface application; a test generating component for generating a set of tests for each user interface application, with the set of tests including the commands for user interface control interactions and assertions of a state of each user interface control interacted with; and a test output component for providing a set of tests for a user interface application.

A computer program product for test generation for robotic process automation robots that interact with user interfaces, the computer program product comprising a computer readable storage medium having program instructions embodied therewith, the program instructions executable by a processor to cause the processor to: obtain analysis of commands in a robotic process automation script to determine interaction of the commands with one or more user interface applications; extract a list of commands that interact with user interface controls and grouping the commands by user interface application; generate a set of tests for each user interface application, with the set of tests including the commands for user interface control interactions and assertions of a state of each user interface control interacted with; and provide a set of tests for a user interface application.

The computer readable storage medium may be a non-transitory computer readable storage medium and the computer readable program code may be executable by a processing circuit.

BRIEF DESCRIPTION OF THE DRAWINGS

Embodiments of the present invention will now be described, by way of example only, with reference to the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Embodiments of a computer-implemented method, system, and computer program product are provided for generating tests for robotic process automation (RPA) robots that interact with user interfaces (UIs).

The method derives a set of tests for an RPA robot by identifying the relevant applications that are interacted with. The derived tests for the RPA robots may be distributed and executed as part of application regression testing.

The tests may be contract tests in the form of lightweight tests checking specific interactions with the UI. Contract tests are known from API testing in which integration tests are provided at the consuming API side that call the API using real-world data and make assertions about its expected behavior. The contract tests are run as part of a regression test suite at the providing API side. Contract tests are failed if the behavior of the API is changed in a way that would affect the consumer.

A test generation phase may carry out the following. Given an RPA script, the method may generate sets of tests. Each set of tests encapsulates the RPA script's interactions with a specific application, including the expected state of each application at each stage.

A test execution phase may execute a set of tests against each target application. The set of tests performs the interactions with the application and makes assertions about the expected state. The assertions may be separate testcases within the set of tests.

The team owning the application may execute the set of tests as part of their regression suite, and will be alerted to any changes that would affect the RPA script. The changes may be modified to maintain compatibility with the RPA script, or the RPA script may be modified before the UI change reaches production. This prevents outages due to behavior changes that would break the RPA script.

The RPA testing is an improvement in the technical field of computer automation testing and more particularly in the technical field of testing automated interactions with UI applications.

Figure 1:
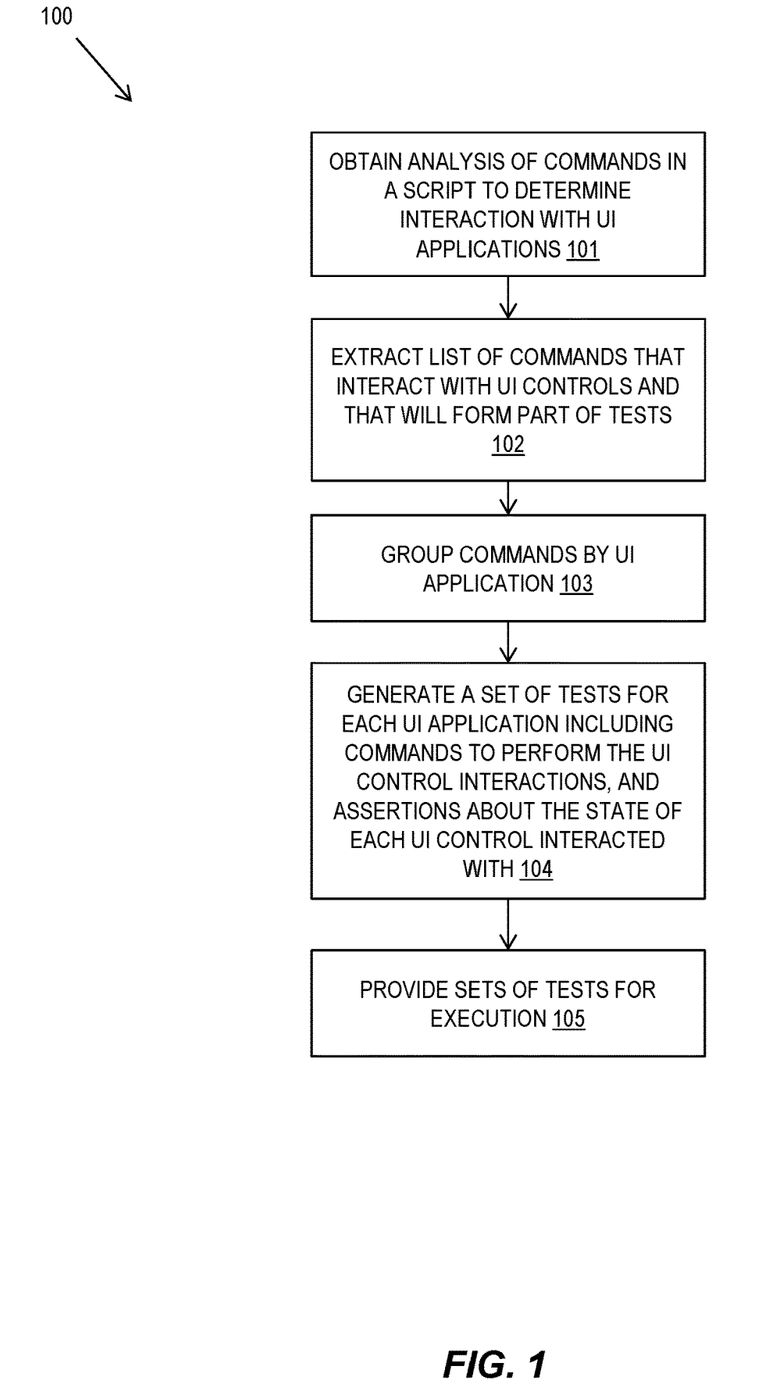
FIG. 1 is a flow diagram of an example embodiment of a method in accordance with embodiments of the present invention.

Referring to FIG. 1, a flow diagram 100 shows an example embodiment of the described method.

The method may obtain analysis 101 of each command in an RPA script to determine whether a command interacts with a UI application. Commands are steps in a robot that would be executed sequentially when the robot is run. Some RPA implementations may categorize commands by type already and this may be used in the analysis. RPA robot scripts are written in either standard languages (for example, a general purpose programming language plus a vendor software development kit), or a Domain Specific Language (DSL).

A "UI application" is any application having a UI. Examples, include web applications, desktop applications, terminal applications, mobile applications, and voice applications. Examples of desktop applications include UI frameworks, operating systems, widget and interface toolkits, etc. Examples of terminal applications include mainframe applications, command-line interfaces, etc. Examples of mobile applications may be different mobile operating system-based applications, emulators of test runners executing on remote mobile devices, etc. Examples of voice applications may include applications using speech-to-text and text-to-speech technology.

A list of commands is extracted 102 that will form part of the tests. The commands are extracted that interact with the UI controls. The commands are grouped 103 by the UI application with which they interact.

The method generates 104 a set of tests for each identified UI application, with the tests including the commands to perform the UI interactions and assertions about the state of each UI control interacted with. The commands may be kept in sequence to retain the appropriate state within the application. The tests may be contract tests in the form of lightweight tests checking specific interactions with the UI.

The tests may define only the parts of the UI that are relevant to successful robot execution and therefore the method identifies which script actions represent interactions that should be replicated in a test. For example, this may be simple in the case of a web UI recorder but may require understanding about what robot commands are UI interactions in client applications.

The method may provide 105 the sets of tests for execution. The generated tests may be RPA robots, or may use a technology-specific framework. A technology-specific framework may be a testing tool for web applications and browsers, or automated UI testing for applications running on an operating system.

The test execution involves running the set of tests for a UI application, executing the UI interactions and assertions. The test execution does not necessarily require the entire RPA robot execution infrastructure; instead, a lightweight test runner may be used.

The sets of tests may be distributed to the teams who own the UI applications, and executed separately as part of automated quality assurance regression.

An example scenario is described below.

An RPA script reads emails from a particular inbox and performs the following steps for each one:
1. Insert a row in a database;
2. Open desktop OS GUI application "ClientLookup";
3. Insert data from the e-mail into ClientLookup and retrieve some results;
4. Open a browser to http://www.example.com/testapp;
5. Log in to TestApp by filling in a form with a username and password, then clicks the Submit button;
6. Enter text in fields named FieldA, FieldB and FieldC;
7. Select an option from ComboA;
8. Click the Next Button;
9. On the resulting page, select option id Option1 from list box List1;
10. Click the Submit button;
11. Extract a value from the resulting page;
12. Update the database with the extracted value.

In this example, there is interaction with a database, a desktop operating system based GUI application, and a web application. Contract tests are therefore required covering only the interactions with each application.

To generate a web UI contract test from an RPA script, the method processes an RPA robot script. It extracts all interactions with web UI controls. In the example above, steps 4-11 are interactions with web UI controls. Other steps (1-3 and 12 in the example) are not required for the contract tests. By excluding them, the dependencies required for the test are reduced. For each interaction with the UI, the following items are generated in the contract test: commands to perform the UI interaction; and assertions about the state of the UI control interacted with.

In step 3 of the example, the following steps may be generated in the contract test:
Find the control at /div[0]/input[1]
Assert the control is a text field, and it is enabled
Enter text 'myuser' in the field.

The same technique may be used to generate contract tests for the other systems/applications that the script interacts with, for example, the desktop operating system based GUI application.

For the desktop GUI application, the contract tests involve extracting all interactions with the GUI controls in the application. For each interaction, contract tests are generated that perform the UI interaction and assert properties of the interactions.

Test execution involves running the contract tests, executing the UI interactions and assertions. This does not require the entire RPA robot execution infrastructure. Instead, a lightweight test runner may be used.

For example, for web applications the generated contract test may actually be a web testing tool test, that could be executed with an existing test runner.

When interacting with a UI application which itself maintains state, such as in a backend database, the test may be executed using a mock database. This further reduces the dependencies for test execution, and avoids an impact on production systems.

The method may derive UI tests from production RPA robot scripts for execution as part of the UI development process, enabling the maintenance of robot scripts to be performed proactively. The advantage of this approach is that outages or delays due to in-production robots breaking are eliminated.

The method generates tests that encapsulate only the UI interactions, and not interactions with other parts of the system from a given RPA script. So failures are limited to UI issues only.

An advantage of deriving a separate UI test from the RPA script, rather than simply executing the robot as a test, is that it does not require a setup/maintenance of a complex infrastructure or a mocked test environment for the rest of the robot to interact with; only the UI portion is required which is familiar to the UI developer executing the test.

Deriving contract tests from an RPA robot also enables a team producing the target application to run those tests. They can therefore identify when a change to the application will break the RPA robot. This means modifications can be made before the change reaches production, avoiding a failure. By identifying and separating the UI interactions with each target application, these tests can be executed more easily than the complete RPA robot. Owners of RPA script target applications can easily execute tests prior to releasing new versions, eliminating regressions.

Examples of problems that this form of testing would detect may include when cascading style sheet styling on a webpage is changed such that a selector in an RPA script no longer finds the control. Another example is a button may be moved on a UI so that a clicked area is no longer aligned with what the script expects.

As the tests encapsulate only the individual UI interactions (and not the interactions with other systems), they will be easy and fast to run. Failures are limited to UI issues and not to other parts of the system. Running the tests does not cause changes to other parts of the system (for example, database updates) as running the robot normally would.

The method enables shift left testing to catch defects earlier in the software development process by detection of breaking changes in robot dependencies. There is a reduced cost of updating robots to resolve breaking changes.

Figure 2:
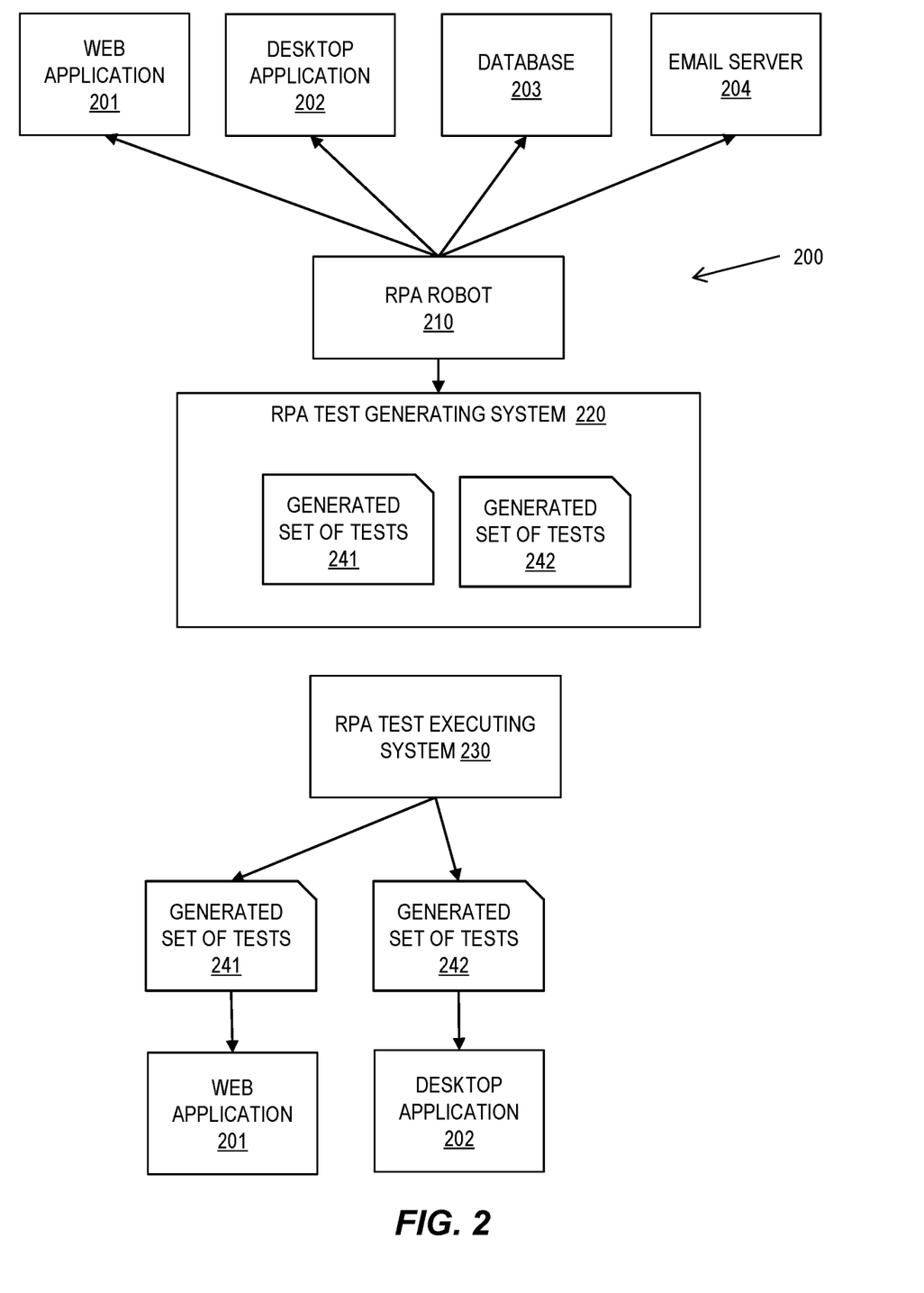
FIG. 2 is a block diagram of a system in which embodiments of the present invention may be provided.

Referring to FIG. 2, a block diagram shows an example system 200. The system 200 includes an RPA robot 210 that interacts with a web application 201, a desktop application 202, a database 203, and an email server 204.

An RPA test generating system 220 is provided that generates sets of tests 241, 242 for each application. In this example, a set of tests 241 is generated for the web application 201 and a set of tests 242 is generated for the desktop application 202. An RPA test executing system 230 may run the sets of tests 241, 242, for example, by running a set of tests 241 on the web application 201 and a set of tests 242 on the desktop application 202.

Figure 3:
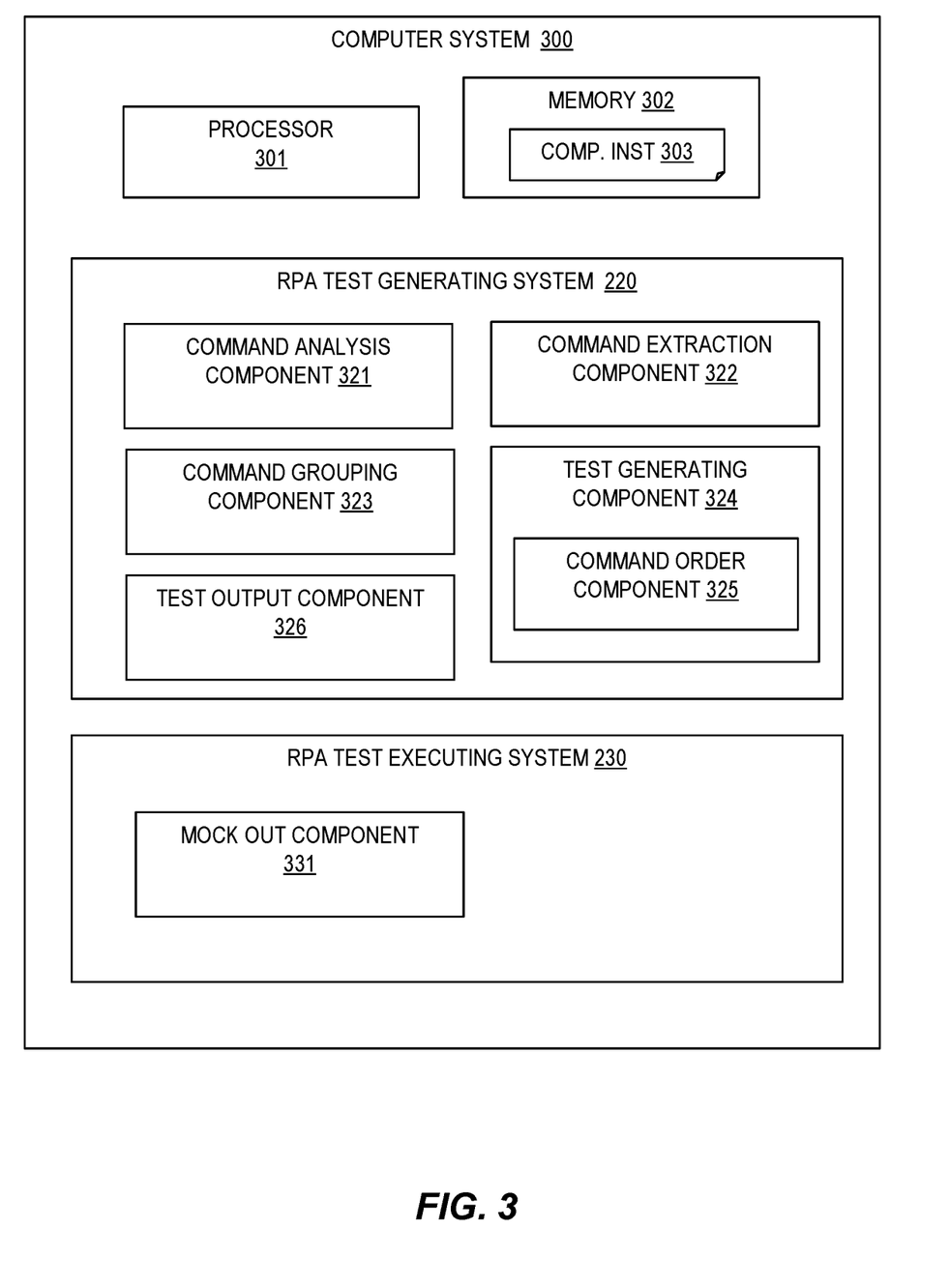
FIG. 3 is block diagram of an example embodiment of a system in accordance with embodiments of the present invention.

Referring to FIG. 3, a block diagram shows an example computing system 300 in which the RPA test generating system 220 and the RPA test executing system 230 may be implemented. The RPA test generating system 220 and the RPA test executing system 230 may be implemented on different computing systems 300.

The computing system 300 may include at least one processor 301, a hardware module, or a circuit for executing the functions of the described components which may be software units executing on the at least one processor. Multiple processors running parallel processing threads may be provided enabling parallel processing of some or all of the functions of the components. Memory 302 may be configured to provide computer instructions 303 to the at least one processor 301 to carry out the functionality of the components.

The RPA test generating system 220 may include a command analysis component 321 for obtaining analysis of commands in a robotic process automation script to determine interaction of the commands with one or more user interface applications. The command analysis component 321 may obtain analysis of commands by accessing existing categorization of commands by type.

The RPA test generating system 220 may include a command extraction component 322 for extracting a list of commands that interact with user interface controls and a command grouping component 323 for grouping the commands by user interface application.

The RPA test generating system 220 may include a test generating component 324 for generating a set of tests for each user interface application, with the set of tests including the commands for user interface control interactions and assertions of a state of each user interface control interacted with. A set of tests may include contract tests in the form of lightweight tests checking specific interactions with the UI. The test generating component 324 may include a command order component 325 for keeping the commands in sequence to retain the appropriate state within the application.

The RPA test generating system 220 may include a test output component 326 for providing a set of tests for a user interface application. The test output component 326 may distribute a set of tests to owners of the user interface applications for execution in the form of a robotic process automation robot or a technology-specific framework for the application. The test output component 326 may make the sets of tests available for retrieval by owners of the user interface applications.

The RPA test executing system or component 230 may be provided for executing a set of tests for a user interface application including executing the user interface interactions and assertions. The RPA test executing system 230 may execute a set of tests in a robotic process automation robot execution infrastructure or in a lightweight test runner.

The RPA test executing system 230 may include a mock out component 331 for when the user interface application of a set of tests is a user interface application that maintains state in a system. The mock out component 331 may provide mock components for each type of external system being mocked. For example, a Structured Query Language (SQL) Database would need a different mock component to a Non-SQL Database. An external system like a queue would need a different mock component again. The different mock components would be provided by the test executing system.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 4:
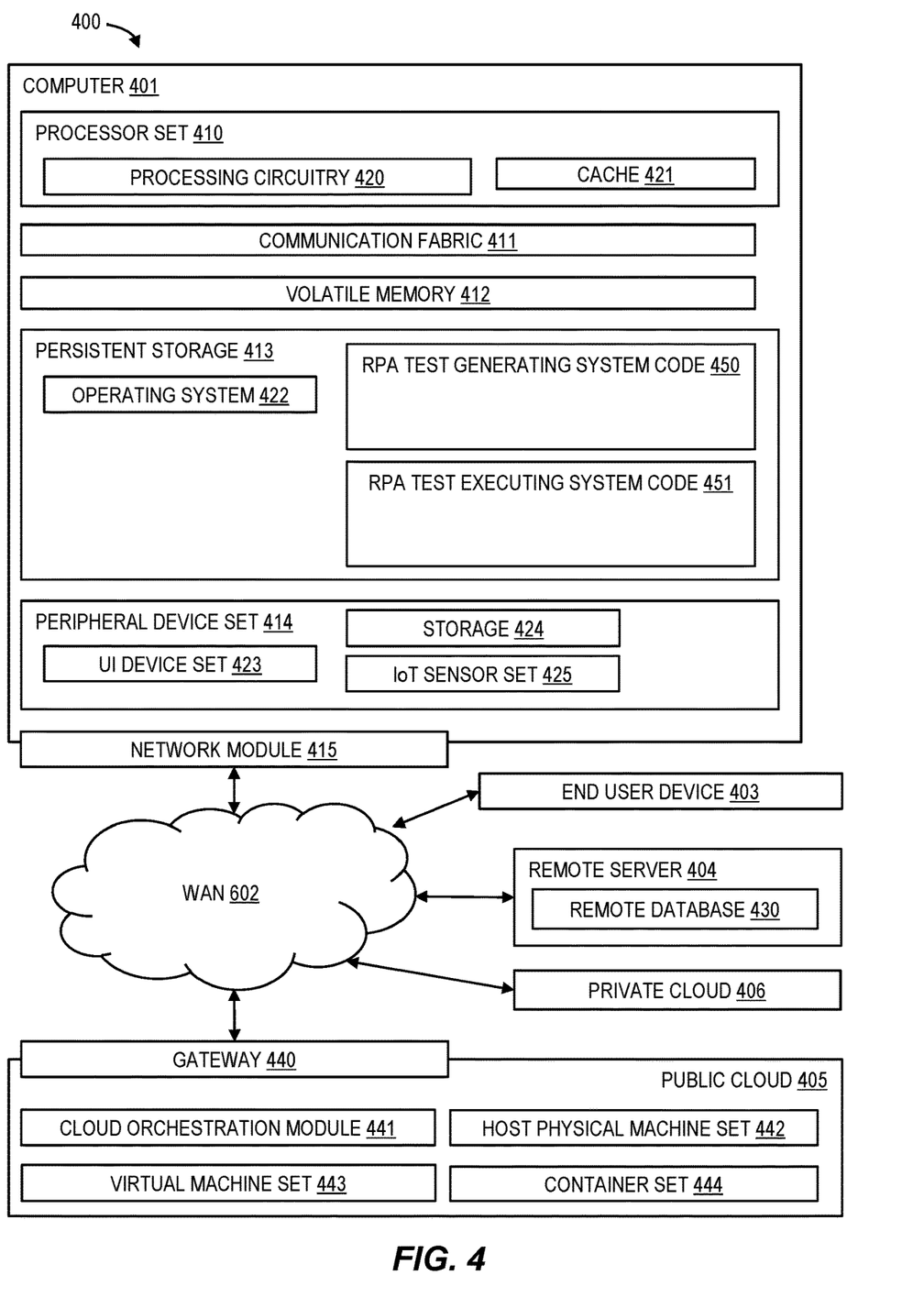
FIG. 4 is a block diagram of an example embodiment of a computing environment for the execution of at least some of the computer code involved in performing the present invention.

Referring to FIG. 4, computing environment 400 contains an example of an environment for the execution of at least some of the computer code involved in performing the inventive methods, such as RPA test generating system code 450 and RPA test executing system code 451. In addition to blocks 450, 451, computing environment 400 includes, for example, computer 401, wide area network (WAN) 402, end user device (EUD) 403, remote server 404, public cloud 405, and private cloud 406. In this embodiment, computer 401 includes processor set 410 (including processing circuitry 420 and cache 421), communication fabric 411, volatile memory 412, persistent storage 413 (including operating system 422 and blocks 450, 451, as identified above), peripheral device set 414 (including user interface (UI) device set 423, storage 424, and Internet of Things (IoT) sensor set 425), and network module 415. Remote server 404 includes remote database 430. Public cloud 405 includes gateway 440, cloud orchestration module 441, host physical machine set 442, virtual machine set 443, and container set 444.

COMPUTER 401 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 430. As is well understood in the art of computer technology, and depending upon the technology, performance of a computer-implemented method may be distributed among multiple computers and/or between multiple locations. On the other hand, in this presentation of computing environment 400, detailed discussion is focused on a single computer, specifically computer 401, to keep the presentation as simple as possible. Computer 401 may be located in a cloud, even though it is not shown in a cloud in FIG. 4. On the other hand, computer 401 is not required to be in a cloud except to any extent as may be affirmatively indicated.

PROCESSOR SET 410 includes one, or more, computer processors of any type now known or to be developed in the future. Processing circuitry 420 may be distributed over multiple packages, for example, multiple, coordinated integrated circuit chips. Processing circuitry 420 may implement multiple processor threads and/or multiple processor cores. Cache 421 is memory that is located in the processor chip package(s) and is typically used for data or code that should be available for rapid access by the threads or cores running on processor set 410. Cache memories are typically organized into multiple levels depending upon relative proximity to the processing circuitry. Alternatively, some, or all, of the cache for the processor set may be located "off chip." In some computing environments, processor set 410 may be designed for working with qubits and performing quantum computing.

Computer readable program instructions are typically loaded onto computer 401 to cause a series of operational steps to be performed by processor set 410 of computer 401 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 421 and the other storage media discussed below. The program instructions, and associated data, are accessed by processor set 410 to control and direct performance of the inventive methods. In computing environment 400, at least some of the instructions for performing the inventive methods may be stored in blocks 450, 451 in persistent storage 413.

COMMUNICATION FABRIC 411 is the signal conduction path that allows the various components of computer 401 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 412 is any type of volatile memory now known or to be developed in the future. Examples include dynamic type random access memory (RAM) or static type RAM. Typically, volatile memory 412 is characterized by random access, but this is not required unless affirmatively indicated. In computer 401, the volatile memory 412 is located in a single package and is internal to computer 401, but, alternatively or additionally, the volatile memory may be distributed over multiple packages and/or located externally with respect to computer 401.

PERSISTENT STORAGE 413 is any form of non-volatile storage for computers that is now known or to be developed in the future. The non-volatility of this storage means that the stored data is maintained regardless of whether power is being supplied to computer 401 and/or directly to persistent storage 413. Persistent storage 413 may be a read only memory (ROM), but typically at least a portion of the persistent storage allows writing of data, deletion of data and re-writing of data. Some familiar forms of persistent storage include magnetic disks and solid state storage devices. Operating system 422 may take several forms, such as various known proprietary operating systems or open source Portable Operating System Interface-type operating systems that employ a kernel. The code included in blocks 450, 451 typically includes at least some of the computer code involved in performing the inventive methods.

PERIPHERAL DEVICE SET 414 includes the set of peripheral devices of computer 401. Data communication connections between the peripheral devices and the other components of computer 401 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 423 may include components such as a display screen, speaker, microphone, wearable devices (such as goggles and smart watches), keyboard, mouse, printer, touchpad, game controllers, and haptic devices. Storage 424 is external storage, such as an external hard drive, or insertable storage, such as an SD card. Storage 424 may be persistent and/or volatile. In some embodiments, storage 424 may take the form of a quantum computing storage device for storing data in the form of qubits. In embodiments where computer 401 is required to have a large amount of storage (for example, where computer 401 locally stores and manages a large database) then this storage may be provided by peripheral storage devices designed for storing very large amounts of data, such as a storage area network (SAN) that is shared by multiple, geographically distributed computers. IoT sensor set 425 is made up of sensors that can be used in Internet of Things applications. For example, one sensor may be a thermometer and another sensor may be a motion detector.

NETWORK MODULE 415 is the collection of computer software, hardware, and firmware that allows computer 401 to communicate with other computers through WAN 402. Network module 415 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 415 are performed on the same physical hardware device. In other embodiments (for example, embodiments that utilize software-defined networking (SDN)), the control functions and the forwarding functions of network module 415 are performed on physically separate devices, such that the control functions manage several different network hardware devices. Computer readable program instructions for performing the inventive methods can typically be downloaded to computer 401 from an external computer or external storage device through a network adapter card or network interface included in network module 415.

WAN 402 is any wide area network (for example, the internet) capable of communicating computer data over non-local distances by any technology for communicating computer data, now known or to be developed in the future. In some embodiments, the WAN 402 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 403 is any computer system that is used and controlled by an end user (for example, a customer of an enterprise that operates computer 401), and may take any of the forms discussed above in connection with computer 401. EUD 403 typically receives helpful and useful data from the operations of computer 401. For example, in a hypothetical case where computer 401 is designed to provide a recommendation to an end user, this recommendation would typically be communicated from network module 415 of computer 401 through WAN 402 to EUD 403. In this way, EUD 403 can display, or otherwise present, the recommendation to an end user. In some embodiments, EUD 403 may be a client device, such as thin client, heavy client, mainframe computer, desktop computer and so on.

REMOTE SERVER 404 is any computer system that serves at least some data and/or functionality to computer 401. Remote server 404 may be controlled and used by the same entity that operates computer 401. Remote server 404 represents the machine(s) that collect and store helpful and useful data for use by other computers, such as computer 401. For example, in a hypothetical case where computer 401 is designed and programmed to provide a recommendation based on historical data, then this historical data may be provided to computer 401 from remote database 430 of remote server 404.

PUBLIC CLOUD 405 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 405 is performed by the computer hardware and/or software of cloud orchestration module 441. The computing resources provided by public cloud 405 are typically implemented by virtual computing environments that run on various computers making up the computers of host physical machine set 442, which is the universe of physical computers in and/or available to public cloud 405. The virtual computing environments (VCEs) typically take the form of virtual machines from virtual machine set 443 and/or containers from container set 444. It is understood that these VCEs may be stored as images and may be transferred among and between the various physical machine hosts, either as images or after instantiation of the VCE. Cloud orchestration module 441 manages the transfer and storage of images, deploys new instantiations of VCEs and manages active instantiations of VCE deployments. Gateway 440 is the collection of computer software, hardware, and firmware that allows public cloud 405 to communicate through WAN 402.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 406 is similar to public cloud 405, except that the computing resources are only available for use by a single enterprise. While private cloud 406 is depicted as being in communication with WAN 402, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 405 and private cloud 406 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

The invention claimed is:

1. A computer-implemented method for test generation for robotic process automation robots that interact with user interfaces, said method comprising:
    obtaining analysis of commands in a robotic process automation script to determine interaction of the commands with one or more user interface applications;
    extracting a list of commands that interact with user interface controls and grouping the commands by user interface application;
    generating a set of tests for each user interface application, with the set of tests including the commands for user interface control interactions and assertions of a state of each user interface control interacted with;
    providing a set of tests for a user interface application; and
    executing the set of tests for the user interface application, including executing the user interface interactions and assertions about an expected state of the user interface application, wherein the assertions are separate testcases within the set of tests.

2. The method of claim 1, wherein generating the set of tests for each user interface application includes keeping the commands in sequence to retain an appropriate state within the application.

3. The method of claim 1, wherein the providing of the set of tests for the user interface application provides the set of tests in a form of a robotic process automation robot or a technology-specific framework for the application.

4. The method of claim 1, further includes distributing or making available the sets of tests to owners of the user interface applications for execution.

5. The method of claim 1, wherein the executing of the set of tests is in a robotic process automation robot execution infrastructure or in a lightweight test runner.

6. The method of claim 1, wherein, when the user interface application is a user interface application that maintains state in a system, executing the set of tests using mock outs of external systems.

7. The method of claim 1, wherein the set of tests includes contract tests that are lightweight tests checking specific user interface interactions.

8. The method of claim 1, wherein obtaining analysis of commands accesses existing categorization of commands by type.

9. The method of claim 1, wherein the user interface application is one of the group of: a web application, a desktop application, a terminal application, a mobile application, a voice application.

10. A system for test generation for robotic process automation robots that interact with user interfaces, comprising:
    a processor and a memory configured to provide computer program instructions to the processor to execute the function of the components:
        a command analysis component for obtaining analysis of commands in a robotic process automation script to determine interaction of the commands with one or more user interface applications;
        a command extraction component for extracting a list of commands that interact with user interface controls and a command grouping component for grouping the commands by user interface application;
        a test generating component for generating a set of tests for each user interface application, with the set of tests including the commands for user interface control interactions and assertions of a state of each user interface control interacted with;
        a test output component for providing a set of tests for a user interface application; and
        a test executing component for executing a set of tests for a user interface application including executing the user interface interactions and assertions about an expected state of the user interface application, wherein the assertions are separate testcases within the set of tests.

11. The system of claim 10, wherein the test generating component includes a command order component for keeping the commands in sequence to retain an appropriate state within the application.

12. The system of claim 10, wherein the test output component distributes or makes available for retrieval the sets of tests to owners of the user interface applications for execution in a form of a robotic process automation robot or a technology-specific framework for the application.

13. The system of claim 10, wherein the test executing component executes the set of tests in a robotic process automation robot execution infrastructure or in a lightweight test runner.

14. The system of claim 13, wherein the test executing component includes a mock out component for providing mock components for external systems for when the user interface application maintains state in a system.

15. The system of claim 14, wherein the set of tests includes contract tests that are lightweight tests checking specific user interface interactions.

16. The system of claim 15, wherein the command analysis component obtains analysis of commands accesses existing categorization of commands by type.

17. The system of claim 16, wherein the user interface application is one of the group of: a web application, a desktop application, a terminal application, a mobile application, a voice application.

18. A computer program stored on a computer readable medium and loadable into an internal memory of a digital computer, comprising software code portions, when said program is run on a computer, for performing the method comprising:

obtaining analysis of commands in a robotic process automation script to determine interaction of the commands with one or more user interface applications;

extracting a list of commands that interact with user interface controls and grouping the commands by user interface application;

generating a set of tests for each user interface application, with the set of tests including the commands for user interface control interactions and assertions of a state of each user interface control interacted with;

providing a set of tests for a user interface application; and executing the set of tests for the user interface application, including executing the user interface interactions and assertions about an expected state of the user interface application, wherein the assertions are separate testcases within the set of tests.

* * * * *